(12) United States Patent
Stokking et al.

(10) Patent No.: US 9,654,330 B2
(45) Date of Patent: *May 16, 2017

(54) METHOD AND SYSTEM FOR TRANSMITTING A MULTIMEDIA STREAM

(71) Applicant: Koninklijke KPN N.V., The Hague (NL)

(72) Inventors: Hans Maarten Stokking, The Hague (NL); Mattijs Oskar Van Deventer, Leidschendam (NL); Fabian Arthur Walraven, Groningen (NL); Omar Aziz Niamut, Vlaardingen (NL)

(73) Assignee: Koninklijke KPN N.V., The Hague (NL)

(*) Notice: Subject to any disclaimer, the term of this patent is extended or adjusted under 35 U.S.C. 154(b) by 0 days.

This patent is subject to a terminal disclaimer.

(21) Appl. No.: 14/015,765

(22) Filed: Aug. 30, 2013

(65) Prior Publication Data

US 2014/0040350 A1    Feb. 6, 2014

Related U.S. Application Data

(63) Continuation of application No. 12/808,665, filed as application No. PCT/EP2008/011014 on Dec. 22, 2008, now Pat. No. 8,549,151.

(Continued)

(30) Foreign Application Priority Data

Feb. 12, 2008    (EP) .................................. 08002517

(51) Int. Cl.
*G06F 15/16* (2006.01)
*H04L 29/06* (2006.01)
*H04L 29/08* (2006.01)

(52) U.S. Cl.
CPC .. *H04L 29/06517* (2013.01); *H04L 29/08522* (2013.01); *H04L 65/103* (2013.01);
(Continued)

(58) Field of Classification Search
USPC ........................................................ 709/227
See application file for complete search history.

(56) References Cited

U.S. PATENT DOCUMENTS 6,661,785 B1 * 12/2003 Zhang ............... H04L 29/06027
370/352
6,895,439 B2 * 5/2005 Isomaki et al. ............... 709/229
(Continued)

FOREIGN PATENT DOCUMENTS

EP           1890463         2/2008
SE      WO 2007101473 A1 * 9/2007  ......... H04N 7/17318
(Continued)

OTHER PUBLICATIONS

Schulzrinne, H. et al., RFC 2326: Real Time Streaming Protocol (RTSP), Apr. 1998, IETF, pp. 1-92.*
(Continued)

*Primary Examiner* — Alicia Baturay
(74) *Attorney, Agent, or Firm* — McDonnell Boehnen Hulbert & Berghoff LLP

(57) ABSTRACT

A method is described for transmitting a multimedia stream from a first terminal and receiving an associated second multimedia stream at a second terminal. The first and second terminal are connected to at least one gateway for enabling the transmission of the stream and the receiving of the associated stream. The method comprises: —initiating the exchange of first multimedia session information between the first terminal and the gateway, using a first protocol; —providing a trigger to the second terminal to initiate the exchange of second multimedia session information
(Continued)

between the second terminal and the gateway, using a second protocol; —in response to providing the trigger, the second terminal initiating the exchange of second multimedia session information between the second terminal and the gateway, using a third protocol; —transmitting a first multimedia stream from the first terminal and receiving a second associated multimedia stream at the second terminal.

22 Claims, 9 Drawing Sheets

Related U.S. Application Data

(60) Provisional application No. 61/008,644, filed on Dec. 21, 2007.

(52) U.S. Cl.
CPC ........ *H04L 65/104* (2013.01); *H04L 65/1006* (2013.01); *H04L 65/1069* (2013.01); *H04L 65/4076* (2013.01); *H04L 69/08* (2013.01); *H04L 65/1016* (2013.01); *H04L 65/608* (2013.01)

(56) References Cited

U.S. PATENT DOCUMENTS

| | | | | |
|---|---|---|---|---|
| 7,043,528 B2* | 5/2006 | Schmitt | H04N 7/152 | 348/E7.084 |
| 7,181,537 B2* | 2/2007 | Costa-Requena et al. | ... | 709/246 |
| 7,231,658 B2* | 6/2007 | Kunito | H04L 63/126 | 709/223 |
| 7,286,521 B1* | 10/2007 | Jackson | H04M 7/1245 | 370/352 |
| 7,330,283 B2* | 2/2008 | Lee | H04L 1/0007 | 358/1.15 |
| 7,440,440 B1* | 10/2008 | Abichandani | H04M 3/42212 | 370/351 |
| 7,532,890 B2* | 5/2009 | Davies | H04L 12/587 | 370/395.5 |
| 7,539,177 B2* | 5/2009 | Hoffmann | H04M 3/428 | 370/352 |
| 7,639,384 B2* | 12/2009 | Lee | H04L 1/0007 | 358/1.15 |
| 7,643,411 B2* | 1/2010 | Andreasen | G06Q 20/102 | 370/229 |
| 7,716,310 B2* | 5/2010 | Foti | H04L 65/1069 | 709/220 |
| 7,724,691 B2* | 5/2010 | Mela et al. | ... | 370/261 |
| 7,792,025 B2* | 9/2010 | Segel | H04L 12/5695 | 370/230 |
| 7,804,848 B2* | 9/2010 | Mirtorabi et al. | ... | 370/466 |
| 7,953,867 B1* | 5/2011 | Andreasen | H04L 65/1006 | 709/203 |
| 7,961,714 B1* | 6/2011 | Watson | H04L 12/66 | 370/352 |
| 8,027,353 B2* | 9/2011 | Damola | H04L 29/06217 | 370/401 |
| 8,032,589 B2* | 10/2011 | Foti | H04L 65/4084 | 709/203 |
| 8,046,479 B2* | 10/2011 | Einarsson | H04N 7/17318 | 709/217 |
| 8,098,627 B2* | 1/2012 | Dutta | H04W 36/0038 | 370/331 |
| 8,180,338 B1* | 5/2012 | Sylvain | H04W 76/026 | 455/422.1 |
| 8,549,151 B2* | 10/2013 | Stokking | H04L 65/104 | 709/227 |
| 8,752,107 B2* | 6/2014 | Åstrom | H04N 7/17318 | 725/106 |
| 2002/0004835 A1* | 1/2002 | Yarbrough | H04L 29/06 | 709/230 |
| 2005/0135366 A1* | 6/2005 | Trappeniers | H04N 7/17318 | 370/390 |
| 2005/0141542 A1 | 6/2005 | Handekyn et al. | | |
| 2006/0128376 A1* | 6/2006 | Alexis | ... | 455/426.1 |
| 2006/0291472 A1* | 12/2006 | Guo et al. | ... | 370/395.5 |
| 2007/0025301 A1* | 2/2007 | Petersson | H04L 47/10 | 370/338 |
| 2007/0177616 A1 | 8/2007 | Jabri et al. | | |
| 2007/0201484 A1* | 8/2007 | Kenrick | H04L 29/06027 | 370/395.5 |
| 2008/0092178 A1* | 4/2008 | McNamara | H04N 21/41407 | 725/62 |
| 2009/0100147 A1* | 4/2009 | Igarashi | H04N 7/17309 | 709/218 |
| 2009/0180484 A1* | 7/2009 | Igarashi | H04N 7/17309 | 370/401 |
| 2009/0190603 A1 | 7/2009 | Damola et al. | | |
| 2009/0193469 A1* | 7/2009 | Igarashi | H04N 7/17309 | 725/56 |
| 2009/0217337 A1 | 8/2009 | Åström | | |
| 2009/0235317 A1* | 9/2009 | Igarashi | H04N 7/17309 | 725/82 |
| 2009/0307307 A1* | 12/2009 | Igarashi | H04N 7/17309 | 709/203 |
| 2009/0313376 A1* | 12/2009 | Cedervall | H04L 65/1016 | 709/227 |
| 2010/0005177 A1* | 1/2010 | Cagenius | H04N 7/17318 | 709/228 |
| 2010/0005501 A1* | 1/2010 | Stokking | G10H 1/365 | 725/115 |
| 2011/0209188 A1* | 8/2011 | Petersson | H04L 63/08 | 725/110 |

FOREIGN PATENT DOCUMENTS

| | | | | |
|---|---|---|---|---|
| WO | 2007140812 | 12/2007 | | |
| WO | WO 2007140834 A1 * | 12/2007 | ............ | H04L 29/06 |

OTHER PUBLICATIONS

International Search Report and Written Opinion, PCT International Application No. PCT/EP2008/011014 dated Dec. 22, 2008.

European Extended Search Report, European Patent Application No. 08002517.4 dated Jul. 4, 2008.

Fresa, A. et al., "A Testbed for Experimentation of Innovative Services in the B3G Framework", Testbeds and Research Infrastructures for the Development of Networks and Communities, Feb. 23-25, 2005, pp. 110-119.

Whitehead, S. et al., "An Evaluation of Session Initiation Protocol (SIP) for Use in Streaming Media Applications", Standard-Working-Draft, Internet Engineering Task Force, IETF, No. 2, Oct. 22, 2006, whole document.

Friedrich, O. et al., "Next Generation IPTV Services for an Extended IMS Architecture", Autonomous Decentralized Systems, 2007, Eight International Symposium on IEEE, Mar. 1, 2007, 6 pages.

Takei, Kentaro et al., "Design of Gateway System Between Different Signaling Protocols of the Multimedia Session on the Internet", Information Networking, 2001, Proceedings 15th International Conference, pp. 297-302.

Singh, K. et al., "Interworking Between SIP/SDP and H.323", Internet Engineering Task Force Internet Draft, Jan. 2000, pp. 1-39.

Khan, S. et al., "Experiences with Blending HTTP, RTSP, and IMS", IEEE Communications Magazine IEEE USA, vol. 45, No. 3, Mar. 2007, pp. 122-128.

Bodzinga, Anne et al., "Interworking IPTV Services with IMS", Telecommunications Network Strategy and Planning Symposium, Nov. 2006, pp. 1-5.

Anonymous, "MoFu IVAS Interactive Video Applicatino Server", Whitepaper, Mobilfuture, [Online], Dec. 2006, pp. 1-21, http://mobilfuture.kei.pl/files/MoFu_IVAS_whitepaper_v1.0.pdf.

Weldon, "IMS and IPTV, Perfect Together", Internet Citation [online], Jan. 17, 2006, http://ipcommunications.tmcnet.com/hot-topics/ims/articles/280-ims-iptv-perfect-together.htm, pp. 1-4.

(56) References Cited

OTHER PUBLICATIONS

Singh, Kundan et al., "Interworking Between SIP/SDP and H.323", IP Telecom Services Workshop, Sep. 2000, whole document.
Burger, E., "A Mechanism for Content Indirection in Session Initiation Protocol (SIP) Messages", Network Working Group, Request for Comments 4483, www.rfc-editor.org/rfc/rfc4483.txt, May 2006.
Schulzrinne, H. et al., "Real Time Streaming Protocol 2.0 (RTSP)", MMUSIC Working Group, Internet-Draft, Nov. 19, 2007, draft-ietf-mmusic-rfc2326bis-16.txt.
Schulzrinne, H. et al., RFC 2326: Real Time Streaming Protocol (RTSP), Apr. 1998, IETF.
ETSI, "Telecommunications and Internet Converged Services and Protocols for Advanced Networking (TISPAN); IPTV Architecture; IPTV Functions Supported by the IMS Subsystem", ETSI TS 182 027 V2.0.0 (2008), pp. 1-57.
3rd Generation Partnership Project, 3GPP TS 26.237 V8.0.0 (Dec. 2008), "IMS based PSS and MBMS User Service" Protocols (Release 8), 2008.
Schulzrinne, H. et al., RFC 3550: RTP: A Transport Protocol for Real-Time Applications, Jul. 2003, IETF.
Rosenberg, J. et al., RFC 3261: SIP: Session Initiation Protocol, Jun. 2002, IETF.
Handley, M. et al. RFC 4566: SDP: Session Description Protocol, Jul. 2006, IETF.
Recommendation ITU-T H.248.1, Gateway control protocol: Version 3, 2013.
Rosenberg, J., "Voice on the Net and the IETF" Lucent Technologies, VoN and IETF: Iband98, Nov. 1998.
Singh, K and Schulzrinne, H., "Unified Messaging using SIP and RTSP" IP Telecom ServicesWorkshop, Sep. 2000, Atlanta, Georgia.
Wikipedia entry, "Session Initiation Protocol" 2007, at http://en.wikipedia.org/wiki/Session_Initiation_Protocol.
Wikipedia entry, "Session Description Protocol" 2007, at http://en.wikipedia.org/wiki/Session_Description_Protocol.
Wikipedia entry, "Real-time Transport Protocol" 2007, at http://en.wikipedia.org/wiki/Real-time Transport Protocol.
Wikipedia entry, "Real Time Streaming Protocol" 2007, at http://en.wikipedia.org/wiki/Real Time Streaming Protocol.
Ericpol Telecom, SIP-RTSP Gateway, Marketing Webpage, 2007, at http://www.ericpol.pl/index.php/en/network_migration/sip_rtsp_gateway/.
Ericpol i-Evolution, "Network Migration & Combinatorial Services" Marketing Whitepaper, 2004.
Telecommunications and Internet converged Services and Protocols for Advanced Networking (TISPAN); IMS-based IPTV stage 3 specification; ETSI TS 183 063 V2.1.0 (Jun. 2008).
Telecommunications and Internet converged Services and Protocols for Advanced Networking (TISPAN); Dedicated IPTV subsystem stage 3 specification; ETSI TS 183 064 V2.1.1 (Oct. 2008).
Telecommunications and Internet converged Services and Protocols for Advanced Networking (TISPAN); IPTV Architecture; Dedicated subsystem for IPTV functions; ETSI TS 182 028 V2.0.0 (Jan. 2008).
Meng Guo; Ammar, M.H.; Zegura, E.W. "A Vehicle-to-Vehicle Live Video Streaming Architecture," Pervasive Computing and Communications, 2005. PerCom 2005. Third IEEE International Conference on Mar. 8-12, 2005 Page(s):171-180.

* cited by examiner

METHOD AND SYSTEM FOR TRANSMITTING A MULTIMEDIA STREAM

CROSS REFERENCE TO RELATED APPLICATIONS

The present patent application is a continuation of U.S. patent application Ser. No. 12/808,665, entitled "Method and system for transmitting a multimedia stream," filed Jun. 16, 2010, which is a national stage entry of PCT/EP2008/11014, filed Dec. 22, 2008, which claims priority to U.S. Provisional Patent Application Ser. No. 61/008,644, filed Dec. 21, 2007, and to European Patent Application No. 08002517.4, filed Feb. 12, 2008. The full disclosure of U.S. patent application Ser. No. 12/808,665 is incorporated herein by reference.

FIELD OF THE INVENTION

The invention relates to a method and a system for transmitting a multimedia stream from a first terminal to a second terminal. In particular, the invention relates to a method and system for transmitting a first multimedia stream from a first terminal and receiving a second associated stream at a second terminal. The invention further relates to a gateway and a device for use in such system.

BACKGROUND OF THE INVENTION

IP Multi-Media Subsystem (IMS) defined by the 3GPP and 3GPP2 standards open the door to a whole range of new multimedia services, such as Voice over IP (VoIP) and IPTV. The IMS service architecture enables to combine multimedia services of various types.

One type of services may enable viewers at home to participate real-time in a live TV show using e.g. a webcam at home. The multimedia streams generated by the webcam are transported from the home-located user over an IP network to the TV studio using the Real-time Transport Protocol (RTP). In an IMS based architecture such multimedia streaming sessions between clients are set up using the Session Initiation Protocol (SIP), whereas the Real Time Streaming Protocol (RTSP) is typically used for streaming multimedia content from a server to a client.

Systems that provide an interface between SIP and RTSP domains, usually referred to as SIP-RTSP gateways, are known in the art. Within ETSI TISPAN Standardization (WI2048, TS 182 027) an architecture is proposed in which a terminal, comprised in a device such as for example a set-top box, a personal computer, a personal digital assistant (PDA) or a mobile telephone with multi-media capabilities, uses SIP to set up a multimedia session with a selected content provider. After establishment of the session, RTSP is used to select, retrieve and control the streamed content. Further, the University of Colombia (Kundan Singh and Henning Schulzrinne, "Unified Messaging using SIP and RTSP", IP Telecom Services Workshop, September 2000, Atlanta, Ga., US) has developed a SIP-RTSP Gateway for multimedia unified messaging.

These systems use SIP and RTSP clients at the user side and SIP clients and RTSP servers in the network, thereby enabling a user to initiate the set up multimedia session in which multimedia content is streamed from the RTSP servers to the user.

Another gateway system that may be used to stream multimedia between different protocol domains is described in TAKEI K ET AL "Design of gateway system between different signaling protocols of the multimedia session on the internet" INFORMATION NETWORKING, 2001. PROCEEDINGS. 15$^{TH}$ INTERNATIONAL CONFERENCE ON 31 January-2 February, PISCATAWAY, NJ, USA, IEEE, 2001, PAGES 297-302, ISBN: 0-7695-0951-7/01. This system is used to interwork the SIP and the H323 protocol domains. Both protocols are peer-to-peer type protocols and allow for bidirectional set-up/initiation of sessions.

One problem related to these known systems is that they do not provide all the functionality needed for the above mentioned services, which require the user to initiate the set up a multimedia session such that user-generated content is streamed from the user (the transmitting-end) to the studio (the receiving-end), whereby the studio may want to control the stream of user generated content. A known protocol for controlling a stream is RTSP, whereby the receiving-end, with RTSP client functionality, may be able to pause, or forward or backward a stream, or play a stream at a different speed. If the transmitting-end on the other hand is only capable of using the SIP protocol for setting up and maintaining the multimedia streaming session, the mentioned services cannot be realized with the known prior art systems, since the SIP protocol does not provide the means for controlling a stream in the way that for instance the RTSP protocol is capable of.

Another problem related to the streaming of multimedia, that may arise with prior art systems, is that when the receiving-end is only equipped with client functionality of a client-server type of protocol for receiving multimedia, it may only be capable of initiating a multimedia session. If the transmitting-end, using for example a peer-to-peer type of protocol, such as the SIP protocol, wants to initiate a multimedia streaming session, the receiving-end is not capable to respond to such an invitation. Prior-art systems, such as the known SIP-RTSP gateways and the known SIP-H323 gateways do not provide a solution for this problem.

A variety of additional problems may arise with prior art systems, when the user generated multimedia has to be streamed to a multiple of receiving-ends. These receiving-ends may all have different capabilities or preferences when it comes to receiving a multimedia stream. One receiving-end may want to receive a live stream, whereas the other may want to be able to control the stream as described above. Additionally these preferences and capabilities, as well as the network addresses of the receiving-ends, may not be known to the transmitting-end.

SUMMARY OF THE INVENTION

It is an object of the invention to reduce or eliminate at least one of the drawbacks known in the prior art and to provide a method and system for transmitting a first multimedia stream from a first terminal and receiving a second associated multimedia stream at a second terminal.

In an embodiment the first and second terminal are connected to at least one gateway for enabling the transmission of the first multimedia stream and the receiving of the second associated stream. The method comprises the steps of:

initiating the exchange of first multimedia session information between the first terminal and the gateway, using a first protocol;

providing a trigger to the second terminal to initiate the exchange of second multimedia session information between the second terminal and the gateway, using a second protocol;

in response to the providing of the trigger, the second terminal initiating the exchange of second multimedia session information between the second terminal and the gateway, using a third protocol, the third protocol being different from the second protocol;

transmitting a first multimedia stream from the first terminal and receiving a second associated multimedia stream at the second terminal.

The method thus allows the user of a first terminal to transmit a multimedia stream of real-time user-generated content to a second terminal, whereby the first terminal uses a different multimedia protocol to set up a multimedia stream as that the second terminal uses to receive the associated multimedia stream.

In the method according to the embodiment a gateway is capable of connecting a first terminal supporting a first protocol, e.g. SIP, to a second terminal supporting a different (third) protocol, e.g. RTSP. Towards the first terminal, i.e. the (originating) SIP client at the user side, the gateway acts as (terminating) SIP client. The gateway exchanges information about the specifications of the first multimedia session with the first terminal. In the first multimedia session a multimedia stream is transmitted from the first terminal. Towards the second terminal, i.e. the RTSP client, the gateway acts as RTSP server on behalf of the user, whereby the second terminal uses RTSP for exchanging information about the specifications of the second multimedia session with the gateway. In the second multimedia session a multimedia stream is received by the second terminal.

The second terminal is triggered, using a second protocol that is different from the protocol used by the second terminal to exchange second multimedia session information, informing the second terminal of the availability of a new multimedia stream and activating the RTSP client to connect to the RTSP server function of the gateway. Optionally the activation of the RTSP client may occur only after approval of the user of the second terminal. The approval step is then simply part of the fully automated process.

The gateway acts both as a SIP client and RTSP server and may provide a trigger to the second terminal for connecting the second terminal to the gateway. The invention is based on the idea that the trigger is provided using a different protocol then the protocol used by the second terminal to arrange the receipt of multimedia. This idea is based on the insight that some protocols are only capable of initiating a multimedia session in one direction. The trigger (message) ensures that SIP clients from the user and RTSP clients from the studio can be connected in order to enable user-generated content to be transmitted from the first terminal to the second terminal.

In a further embodiment of the method according to the invention, the exchange of first multimedia session information comprises the providing to the first terminal of at least part of the second multimedia session information and whereby transmitting of the first multimedia stream from the first terminal is started in response to said providing. This has the advantage of providing additional flexibility to the method. It is no longer the gateway that supplies preconfigured specifications of both related multimedia sessions to the terminals involved in the transmitting and receiving of the stream, but the gateway may use (requested by) settings from the second receiving terminal, and supply these to the first, transmitting, terminal. Vice versa, and for the same benefit, the gateway may use (requested by) settings from the first transmitting terminal, and supply these to the second, receiving, terminal. In both situations the transmitting, respectively receiving of multimedia streams may only start after the exchange of these settings.

In an embodiment of the method, the first protocol is a peer to peer type protocol, preferably the Session Initiation Protocol (SIP). The advantage of the peer-to-peer protocol is that both sides may initiate the set-up of a streaming session. So in the invention, it may be the first terminal offering a multimedia stream or it may be the gateway first requesting the first terminal to offer a multimedia stream. The SIP protocol is a very commonly used protocol in multimedia sessions, and therefore a lot of devices and network architecture support this protocol.

In a further embodiment of the method the third protocol is a client-server type protocol, preferably the Real Time Streaming Protocol (RTSP). Typically a client-server type of protocol is a protocol that is designed to support only one way initiation of the set up of a multimedia session. Only the client can typically initiate the set-up. Therefore the invention is advantageously used when the second receiving terminal has only client capabilities of such a protocol and therefore is unable to receive an invitation via such a protocol. The use of the RTSP protocol, may be advantageous, when the receiving second terminal wants to control the incoming stream and use the special control options of this protocol.

In a further embodiment of the method, the step of providing a trigger to the second terminal is initiated by the gateway. Having the gateway and not for example the first terminal provide the trigger, may be advantageous when the first terminal does not have the right trigger capabilities, does not know how to reach the second terminal, and in case of a multiple of receiving terminals, that need to be reached.

In yet a further embodiment of the method, the trigger comprises a network address, preferably an URI or URI reference, of the gateway. This may be advantageous, if the second terminal is not configured with a default address, or the default (proxy) address normally used for receiving multimedia streams is not applicable.

In another embodiment of the method, the exchange of first multimedia session information comprises the provisioning of an identifier of the second terminal to the gateway. This may be advantageous, if it is the gateway that provides the trigger to the second terminal. In that situation, it is the gateway that needs to be able to identify the address of the second terminal to be reached.

In a further embodiment of the method, the method comprises the addition step of resolving the identifier of the second terminal into a network address, before provisioning of the trigger to the second terminal. This may be the situation, when the trigger is sent by the gateway and the identifier does not comprise of a network address of the second terminal. The identifier may be a closed user group ID, in which case all network addresses of all receiving terminals need to be identified first.

In another embodiment according to the method, the first and the second protocol are identical. This simplifies the implementation of the invention. A situation like this may occur when the receiving terminal has both RTSP and SIP client capabilities. The trigger may then be provided using the SIP protocol, whereas the initiation and set up of the receipt of the multimedia stream may be done, using the RTSP client, thus enabling control functionalities (trickplay) that SIP lacks.

In another embodiment of the method, the second associated multimedia stream is a multicast stream. This may be advantageous when a multiple of receiving terminals may be offered the live multimedia stream. They may, after being provided with the trigger, and having received a multicast address from the gateway in the exchange of second multimedia session information, use IGMP to sign-up for the multicast.

In a further embodiment of the method the first multimedia stream is a multicast stream. This is advantageous when the first transmitting terminal has (received) a multicast address it can use to multicast its multi-media stream.

In yet a further embodiment of the method, the first multimedia stream is the same multimedia stream as the second associated multimedia stream. In this case the (live) content may also be received live/without any substantial delay from the transmitting first terminal. For enabling additional trickplay (control) functionality, the transmitted multimedia stream needs to be streamed and buffered first to a location under the control of a multimedia server such as a RTSP server, before it is retransmitted as a second associated stream to a second terminal. The additional control functions (e.g. forward, backward, pause) may then be exerted on this second associated stream.

In another embodiment of the method, the first terminal and the gateway are both comprised in the same device and the first protocol is an internal protocol. This may be an advantageous implementation when the network (or studio/receiving-end) does not have the gateway functionality according to the invention. Preferably this situation may occur when there exist a one-to-one relationship between the transmitting and receiving terminal, and both terminals are comprised in mobile devices.

In an aspect the invention relates to a system for transmitting a multimedia stream from a first terminal and receiving an associated second multimedia stream at a second terminal, wherein the system comprises:
  a first terminal and second terminal connected to at least one gateway,
  wherein the first terminal comprises (i) means for exchanging first multimedia session information with the gateway, using a first protocol, and (ii) means for transmitting a first multimedia stream;
  wherein the gateway or first terminal comprises (iii) means for triggering a second terminal, using a second protocol, —to initiate the exchange of second multimedia session information between the second terminal and the gateway, using a third protocol,
  wherein the second terminal comprises (iv) means for receiving a trigger, using a second protocol, and v) means for initiating the exchange of second multimedia session information with the gateway in response to said trigger, using a third protocol, and (vi) means for receiving a second multimedia stream, associated with the first multimedia stream;

In a further embodiment of the system according to the invention, the gateway further comprises means for associating the first multimedia session information to the second multimedia session information. This may be advantageous, when the gateway does not have a default configuration, how to instruct transmitting and receiving terminals, but when a more flexible arrangement is required, whereby the setting requests and capabilities of the terminals involved is taken into account when setting up the multi-media sessions.

Yet another aspect of the invention relates to a gateway configured for use in the system according to the invention, wherein the gateway comprises:
  means for exchanging first multimedia session information with a first terminal, using a first protocol
  means for triggering the second terminal, the trigger being provided using a second protocol, in response to which the second terminal is able to initiate the exchange of second multimedia session information with the gateway, and
  means for exchanging second multimedia session information with the second terminal, using the third protocol, the third protocol being different from the first protocol In a further embodiment of the gateway according to the invention, the gateway further comprises means to associate the first multimedia session information and the second multimedia session information with each other In yet a further embodiment of the gateway according to the invention, the gateway comprises SIP client functionality and RTSP server functionality.

In yet a further embodiment of the gateway according to the invention, the gateway is embedded in an IMS network architecture, wherein the first protocol is SIP, the third protocol is RTSP, and wherein
  means for exchanging first multimedia session information are part of the Service Control Function within IMS
  means for the triggering of the second terminal are part of the Service Control Function within IMS
  means for exchanging second multimedia session information are part of the Media Function within IMS IMS is an architecture that is becoming more and more popular among operators to be used for the provisioning of multimedia services to its customers. The distributed gateway according to an embodiment of the invention, is particular advantageous, because it may be implemented using standard(ized) components and functionalities already present in the IMS architecture.

In one embodiment of the invention a first terminal is connected to a second terminal. Further, the first and second terminal are connected to at least one gateway for enabling the multimedia stream to be transmitted from the first terminal to the second terminal. The method comprises the steps of: (i) the first terminal inviting the gateway to set up a first multimedia session between the first terminal and the gateway, the first multimedia session being controlled by a first protocol; (ii) the gateway notifying—in response to the invitation—the second terminal of the pending invitation; (iii) the second terminal setting up—in response to the notification—a second multimedia session between the second terminal and the gateway, the second multimedia session being controlled by a second protocol; (iv) the gateway setting up—in response to the invitation—the first multimedia session; and (v) transmitting a multimedia stream from the first terminal to the second terminal.

The method according to the embodiment thus allows the user of a first terminal, which uses a first multimedia protocol, to stream real-time user-generated content to a second terminal, which uses a second multimedia protocol, where both the first and second terminal act as a client.

In the method according to the embodiment a gateway is capable of connecting a first terminal supporting a first protocol, e.g. SIP, to a second terminal supporting a second protocol, e.g. RTSP. Towards the first terminal, i.e. the (originating) SIP client at the user side, the gateway acts as (terminating) SIP client. The gateway confirms that it is able to receive the multimedia session from the user and provides first terminal with multimedia session information. Towards the second terminal, i.e. the RTSP client, the gateway acts as RTSP server on behalf of the user, whereby the second terminal uses RTSP for session control.

The gateway informs the second terminal that an incoming session is pending and notifies the RTSP client to connect to the RTSP server function of the gateway.

The gateway thus acts as a server for both SIP and RTSP and uses a notification message for connecting to the second terminal RTSP client. This message acts as a trigger message and ensures that legacy SIP clients from the user and RTSP clients from the studio can be connected in order to enable user-generated content to be transmitted from the first terminal to the second terminal.

In one embodiment the first protocol is the Session Initiation Protocol (SIP). In a further embodiment the first terminal transmits an SIP INVITE to the gateway.

In a further embodiment the second protocol is the Real Time Streaming Protocol (RTSP).

In yet another embodiment the gateway transmits a notification message to the second terminal in response to invitation of the first terminal, in order to activate the second terminal to set up the second multimedia session between the second terminal and the gateway.

In one embodiment the method comprises the steps of: —the first terminal transmitting first multimedia session information to the gateway; —the gateway transmitting the first multimedia session information to the second terminal.

In another embodiment the method comprises the steps of: —the second terminal transmitting second multimedia session information to the gateway; —the gateway transmitting the second multimedia session information to the first terminal. The first multimedia session information and/or second multimedia session information is in a further embodiment transmitted using the Session Description Protocol (SDP).

In yet another embodiment the first terminal comprises a SIP client and/or the second terminal comprises an RTSP client.

In a further embodiment the invention relates to a method for transmitting a multimedia stream from a first terminal to a second terminal, wherein the first and second terminal are connected to a first and a second gateway respectively. The gateways are capable of setting up a multimedia session between the first and second terminal. The method comprises the steps of: (i) the first gateway preparing the first terminal for setting up a multimedia session with the second terminal, wherein a first protocol is used for the preparation of the first terminal; (ii) the first gateway inviting the second gateway to set up the multimedia session between the first terminal and the second terminal, the multimedia session being set up by a second protocol; (iii) the second gateway notifying—in response to the invitation—the second terminal to prepare the multimedia session with the first terminal wherein the first protocol is used for preparation of the second terminal; (iv) setting up—in response to the invitation—a multimedia session between first terminal and the second terminal; and (v) transmitting a multimedia stream from the first terminal to the second terminal.

In this embodiment the purpose of the first SIP-RTSP gateway at the user location and the second SIP-RTSP gateway at the studio location is to exchange the correct RTP information (IP addresses, port number, SDP session description, etc.) between the legacy SIP and RTSP functions. This allows the RTP stream to be set-up and controlled by the SIP session and enables the user to trigger the TV studio to retrieve the streamed user-generated content. The RTSP protocol may be used to control the RTP stream.

In one embodiment the first protocol may be the Real Time Streaming Protocol (RTSP). In another embodiment the second protocol is the Session Initiation Protocol (SIP).

In a further embodiment the second gateway transmits a notification message to the second terminal in response to the invitation of the first gateway, in order to activate the second terminal to set up the multimedia session between the first terminal and the second terminal.

In one embodiment the method further comprises the steps of: —the first gateway receiving first multimedia session information from the first terminal using the SDP protocol encapsulated in the first protocol and transmitting the first multimedia session information to the second gateway using the SPD protocol encapsulated in the second protocol; and—the second gateway receiving the first multimedia session information from the first gateway and transmitting the first multimedia session information to the second terminal using the SDP protocol encapsulated in the first protocol.

In another embodiment the method further comprises the steps of: —the second gateway receiving in response to the receipt of the first multi media session information second multimedia session information from the second terminal using the SDP protocol encapsulated in the first protocol and transmitting the second multimedia session information to the first gateway using the SPD protocol encapsulated in the second protocol; —the second gateway receiving the second multimedia session information from the second gateway and transmitting the second multimedia session information to the first terminal using the SDP protocol encapsulated in the first protocol.

The transmission of the multimedia stream from the first terminal to the second terminal is in one embodiment controlled by the RTSP protocol.

In a further embodiment the first terminal comprises a RTSP server connected to the first gateway and/or the second terminal comprises an RTSP client connected to the second gateway.

In a further aspect the invention relates to a system for transmitting a multimedia stream from a first terminal to a second terminal. In one embodiment the system comprises: a first terminal and second terminal connected to at least one gateway, wherein the first terminal comprises (i) means for inviting the gateway to set up a first multimedia session with the first terminal, wherein the first multimedia session is controlled by a first protocol and (ii) means for transmitting a multimedia stream in the first multimedia session to the gateway; and wherein the gateway comprises (iii) means for notifying—in response to the invitation of the first terminal—to set up a second multimedia session between the gateway and the second terminal, the second multimedia session being controlled by a second protocol, (iv) means for setting up—in response to the invitation—the first multimedia session and (v) means for transmitting a multimedia stream to the second terminal.

In a further embodiment a system is provided for transmitting a multimedia stream from a first terminal to a second terminal. The system comprises a first terminal and second terminal connected to a first and a second gateway respectively. The gateways are capable of setting up a multimedia session between the first and second terminal, wherein the first gateway comprises: (i) means for preparing the first terminal for setting up a multimedia session with the second terminal wherein a first protocol is used for the preparation of the first terminal; (ii) means for inviting the second gateway to set up the multimedia session between the first terminal, the multimedia session being set up using a second protocol;

wherein the second gateway comprises: (iii) means for notifying the second terminal—in response to the invitation—to prepare the multimedia session with the first terminal, wherein the first protocol is used for the preparation of the second terminal and (iv) means for setting up—in response to the invitation—a multimedia session between first terminal and the second terminal.

In yet a further aspect the invention relates to a device comprising a first terminal configured for use in the method according to the invention, the device further comprising a gateway according to the invention. This may be advantageous when the (operator) network does not comprise or support a gateway according to the invention. The device may for instance be a first mobile device wanting to offer a live stream to a home computer reachable via the internet.

In another aspect of the invention a device is claimed, comprising a second terminal configured for use in the method according to the invention, the second terminal comprising:

means for receiving a trigger, provided under the use of a second protocol means for initiating the exchange of second multimedia session information with the gateway, in response to the providing of the trigger to the second terminal, said initiating and exchange executed under the use of a third protocol, said third protocol being different from said second protocol.

means for receiving a second multimedia stream associated to a first multimedia stream Preferably this device is configured in such a way that the second terminal comprises a RTSP client and the third protocol used to initiate the exchange of second multimedia stream session information, is the RTSP protocol. This has the advantage that this device may now be able to control the receipt of a multimedia stream and thereby use the available trick play functionality provided by the RTSP protocol.

In a further aspect the invention also relates to a computer program product comprising software code portions configured for, when run in the memory of a terminal or gateway, executing the method steps according to the invention.

The invention will be further illustrated with reference to the attached drawing, which schematically show embodiments according to the invention. It will be understood that the invention is not in any way restricted to these specific embodiments.

DETAILED DESCRIPTION

Figure 1:
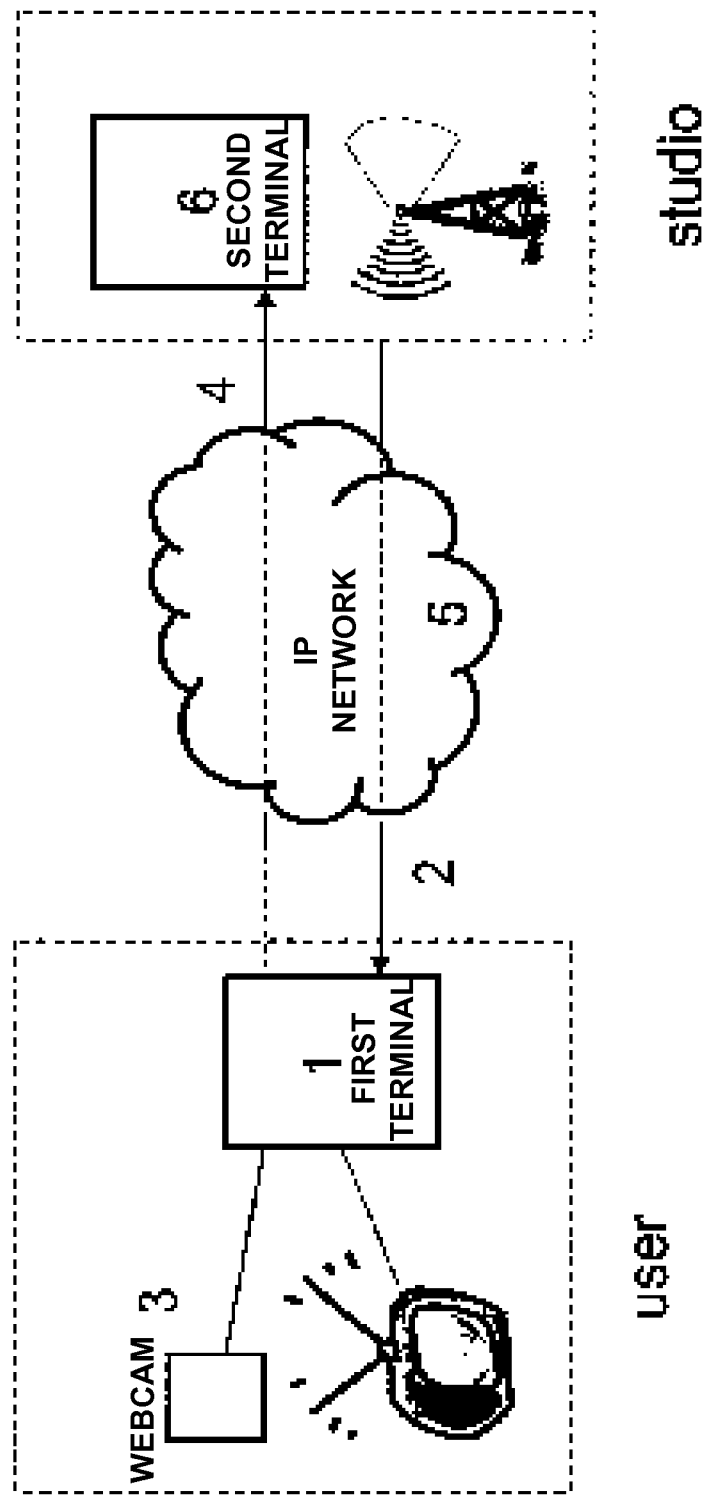
FIG. 1 illustrates an exemplary system in which the present invention may be used.

FIG. 1 illustrates an exemplary system in which the present invention may be used. At the home-location a first terminal 1, e.g. comprised in a set-top box, is connected to display device, e.g. a television. Further, the first terminal receives a TV signal 2, which is broadcasted by the television studio and which comprises a program providing live multimedia participation of home-located user. In one embodiment the multimedia participation of the user may be realized using e.g. a web-cam 3 connected to the terminal. The multimedia stream 4 generated by the web-cam is streamed over an IP network 5 to a second terminal 6 located at the TV studio. At the TV studio the second terminal 6 receives the user-generated multimedia stream 4. This way a live video feed from the user to the studio may be provided.

Such a service requires (i) a home-located user to be able to set up a multimedia session between the home-located, first terminal 1 and the second terminal 6 located at the studio, wherein the multimedia session enables the streaming of user-generated multimedia content 4 to the studio, and (ii) to enable the studio to control (e.g. play, pause, stop) the multimedia stream sent by the home-located terminal.

It is understood that the system at the home location allowing multimedia participation as described in connection with FIG. 1 may be realized in various alternative ways. Those skilled in the art will understand that the first terminal 1, the display device and the web-cam may be for instance integrated in one device such as a personal computer, a digital assistant (PDA), a mobile telephone with multimedia capabilities. Similarly, the system at the studio may for example be a media server comprising the second terminal, wherein the second terminal comprises a RTSP client for multimedia stream retrieval. Alternatively, the second terminal may be located in a mixer or a transcoder and configured for multimedia stream adaptation.

In a further variant, the second terminal may be part of device, that is located at another (home) location, and may be used for user-to-user multimedia stream transmission. The device comprising the second terminal may be a dedicated Set-Top Box (STB), a personal computer or mobile phone containing media player software.

The first terminal may be regarded as a functional unit in a device, or a device capable of managing (initiating, negotiating, monitoring and controlling) the transmission of a multimedia stream. Similarly, the second terminal may be regarded as a functional unit in a device, or a device capable of managing (initiating, negotiating, monitoring and controlling) the receipt of a multimedia stream.

In an IMS architecture the SIP protocol is used to set up and/or negotiate a multimedia session between two SIP clients e.g. two IP phones. Here, the term client may indicate a certain capability of a device or terminal. For example a SIP client may refer to a device configured for using the SIP protocol or to a terminal having SIP capability.

Figure 2:
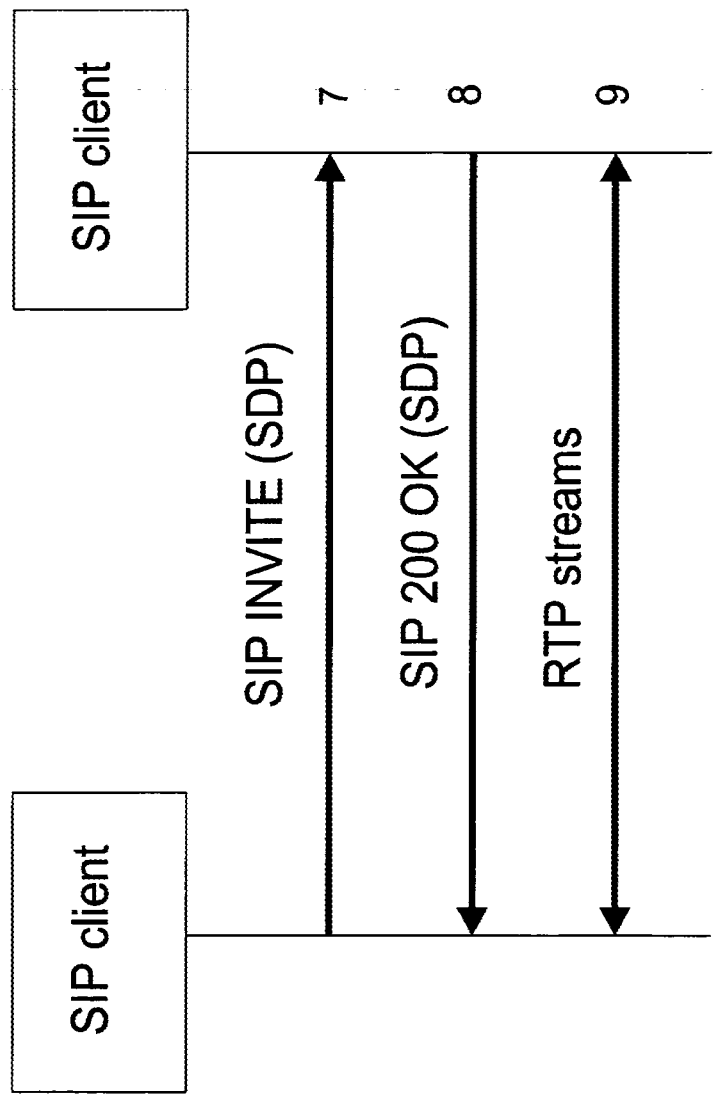
FIG. 2 depicts a simplified exemplary flow of information using the SIP protocol.

An exemplary flow using the SIP protocol is depicted in FIG. 2. Typically a first SIP client sends a SIP INVITE 7 to the second SIP client, which in return accepts the invitation by transmitting a SIP 200 OK 8 message to the first SIP client. Both messages may carry information about the multimedia session. This information is exchanged using the Session Description Protocol (SDP), which may be encapsulated in the SIP protocol. The multimedia session information may include amongst others IP addresses, port numbers for the RTP streams, the type of media (voice, audio, video, etc.) and codec information. Thereafter, multimedia may be streamed between the SIP clients using the RTP protocol 9.

SIP however is designed for setting up and supporting interactive media sessions. Although SIP also provides a form of aggregate streaming control (i.e. the ability to control multiple streams from different locations with one control session), it does not provide for an efficient control as provided by the RTSP protocol used in streaming applications such as Video on Demand (VoD). RTSP allows a client to remotely control a streaming media (RTSP) server by issuing VCR-like commands e.g. play, pause, stop, skip forward, skip backward etc. and allows time-based access to files on a server. Moreover, legacy equipment may require the use of RTSP, since legacy equipment may not be provided with a SIP client.

Figure 3:
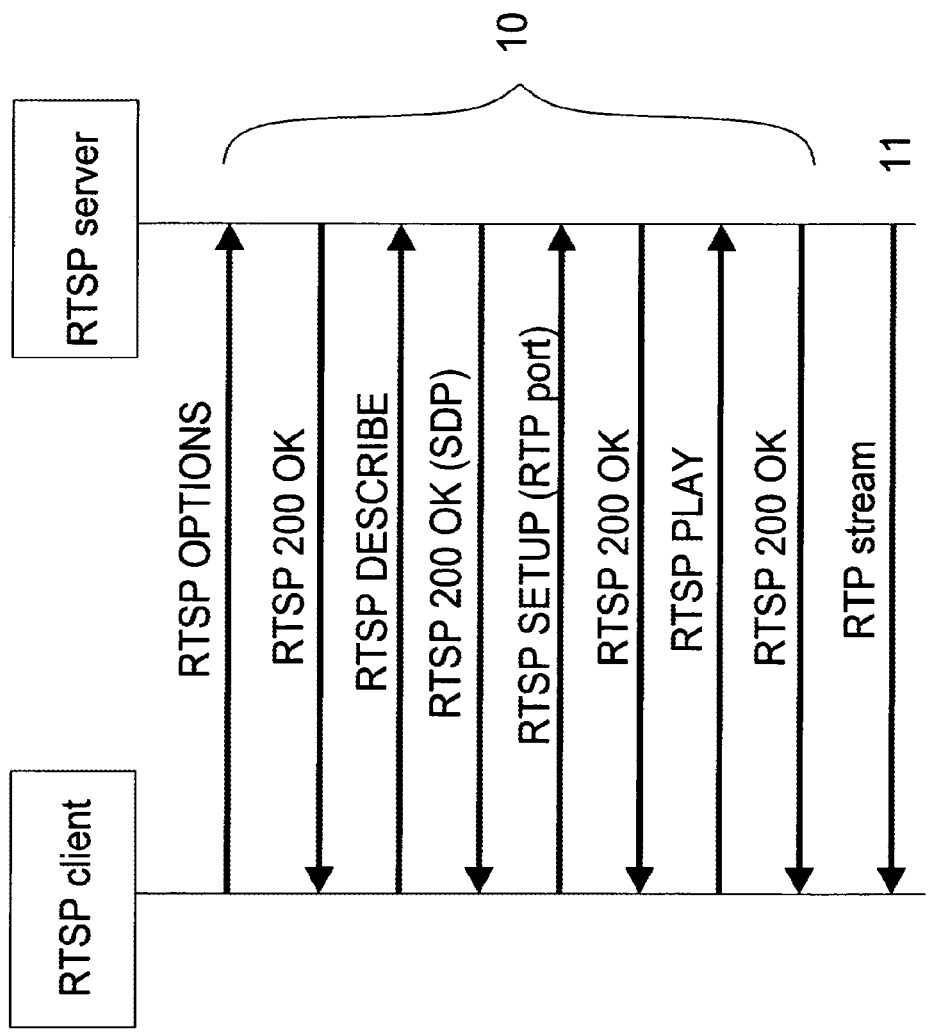
FIG. 3 depicts an exemplary flow of information using the RTSP protocol.

FIG. 3 schematically depicts an exemplary flow using the RTSP protocol. In setting up and controlling a RTSP multimedia session between an RTSP client and an RTSP server, standard RTSP messages 10 (OPTIONS, DESCRIBE, SETUP, PLAY) are exchanged between the client and the server in order to provide both sides with information required for an RTSP session. The way the RTSP protocol is designed to operate, it is always the RTSP client and not RTSP server that initiates the set up of such a session. Similar to SIP, RTSP session information is exchanged using the Session Description Protocol (SDP), which may be encapsulated in the RTSP protocol. Once the session is set up, multimedia may be streamed from the server to the client 11, using the RTP protocol, wherein RTSP allows the client to control the streaming.

Figure 4:
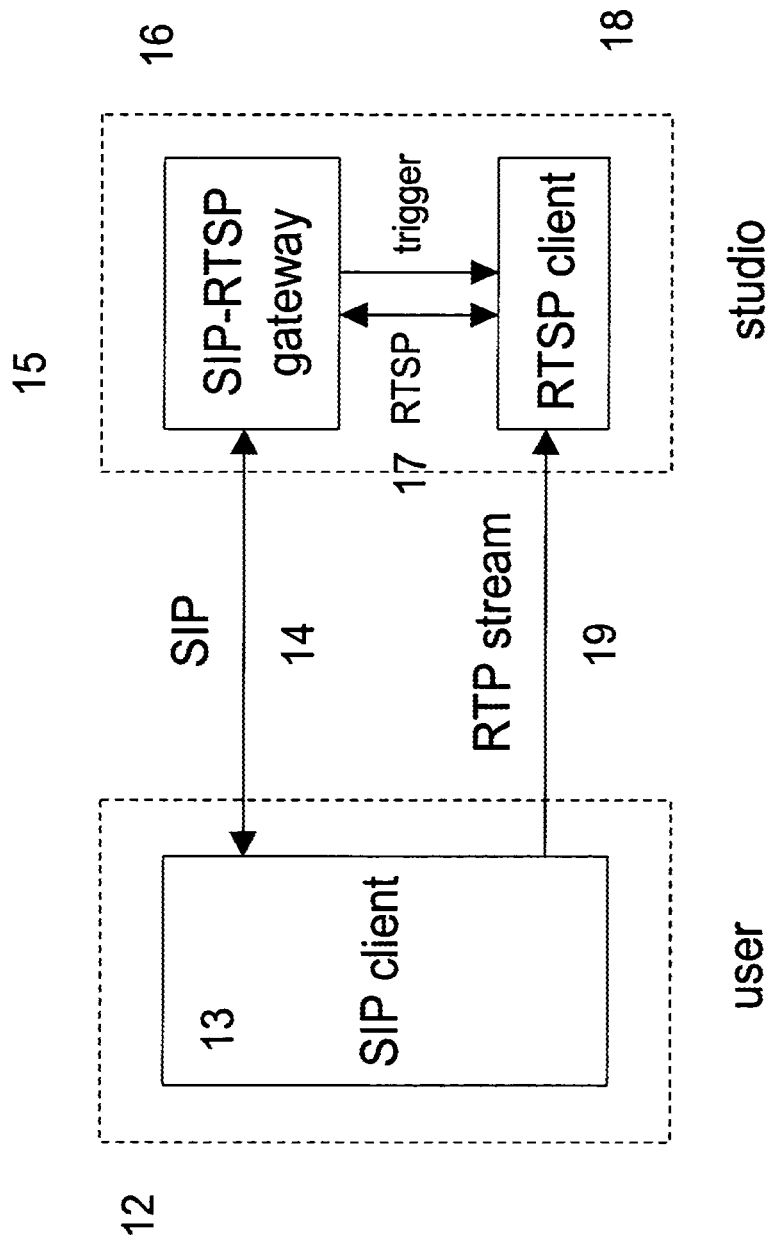
FIG. 4 depicts an exemplary embodiment of the invention.

FIG. 4 depicts a schematic view of a system representing an exemplary embodiment according to the invention. In this embodiment a home located first terminal 12 comprises a SIP client 13, which is capable to set up a SIP session 14 with an SIP-RTSP gateway 15. The SIP-RTSP gateway may be located in a device that may also comprise the second terminal 16 at the TV studio. The second terminal 16 comprises a RTSP client.

Towards the (originating) SIP client of the first terminal at the user side, the gateway acts as a (terminating) SIP client. The gateway confirms that it is able to receive the multimedia session from the first terminal and informs the first terminal at the user side on the session details and the RTP port number. This first multimedia stream session information may be exchanged using the SDP protocol, which may be encapsulated in the SIP messages.

The gateway may further be capable of resolving an identifier received from the first terminal, used to identify the second terminal, into a network address of the second terminal. The resolution process may be performed by the gateway or under the control of the gateway by another module. The identifier may already be a suitable network address of the second terminal, in case of which the resolving is not required.

In response to the initiation of the exchange of first multimedia stream session information, after being provided with a suitable network address, the gateway may send a trigger message to the second terminal. The trigger message instructs the RTSP client to initiate an RTSP session with the gateway. The gateway does not have to send the trigger itself, but may also instruct another module (such as a Short Message Service Center SMSC) to do so on its behalf.

Hence, towards the second terminal comprising the RTSP client 18, the SIP-RTSP gateway acts as an RTSP server, thereby allowing the RTSP client to have RTSP session control over the RTP stream 19, which is transmitted from the first terminal (SIP client) and received as an associated second multimedia stream at the second terminal (comprising the RTSP client).

The first multimedia stream may be the same multimedia stream as the second associated multimedia stream. In that case content is streamed directly from the first to the second terminal. The transmitted first stream is not buffered under the control of a RTSP server before being further transmitted as a second associated stream to the second terminal. This has the advantage that the content is being presented in 'live modus' to the second terminal. In this modus the trickplay functionalities (pause, fast forward etc.) of the RTSP client can not be used to control the stream.

Figure 5:
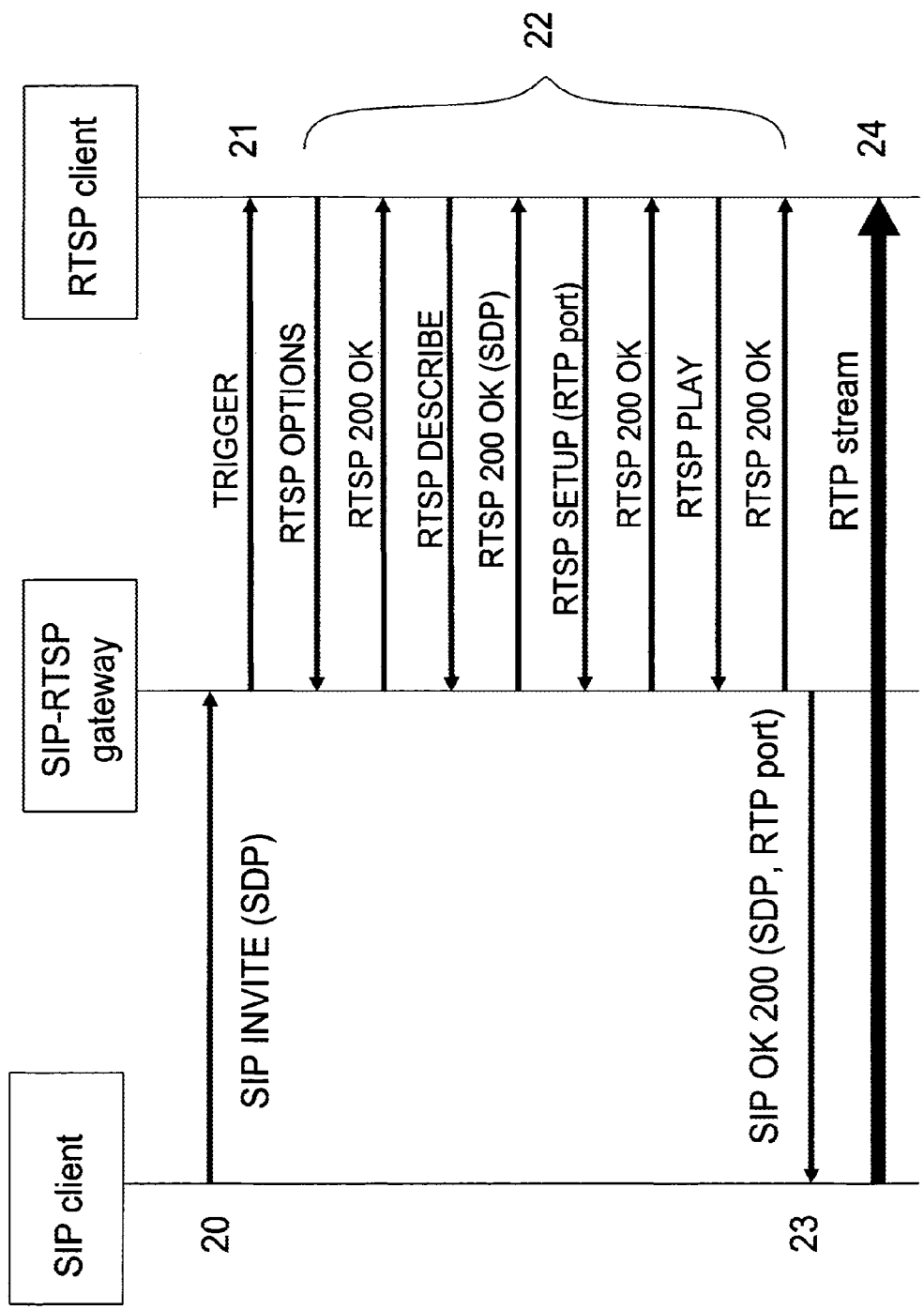
FIG. 5a depicts the flow of information between a SIP client, a SIP-RTSP gateway and a RTSP client in an exemplary embodiment of the invention.
FIG. 5b depicts the flow of information between a SIP client, a SIP-RTSP gateway and a RTSP client in another exemplary embodiment of the invention.
FIG. 5c depicts the flow of information between a SIP client, a SIP-RTSP gateway and a RTSP client in an exemplary embodiment of the invention, whereby the first terminal and the gateway are both comprised in a mobile device
Figure 5:
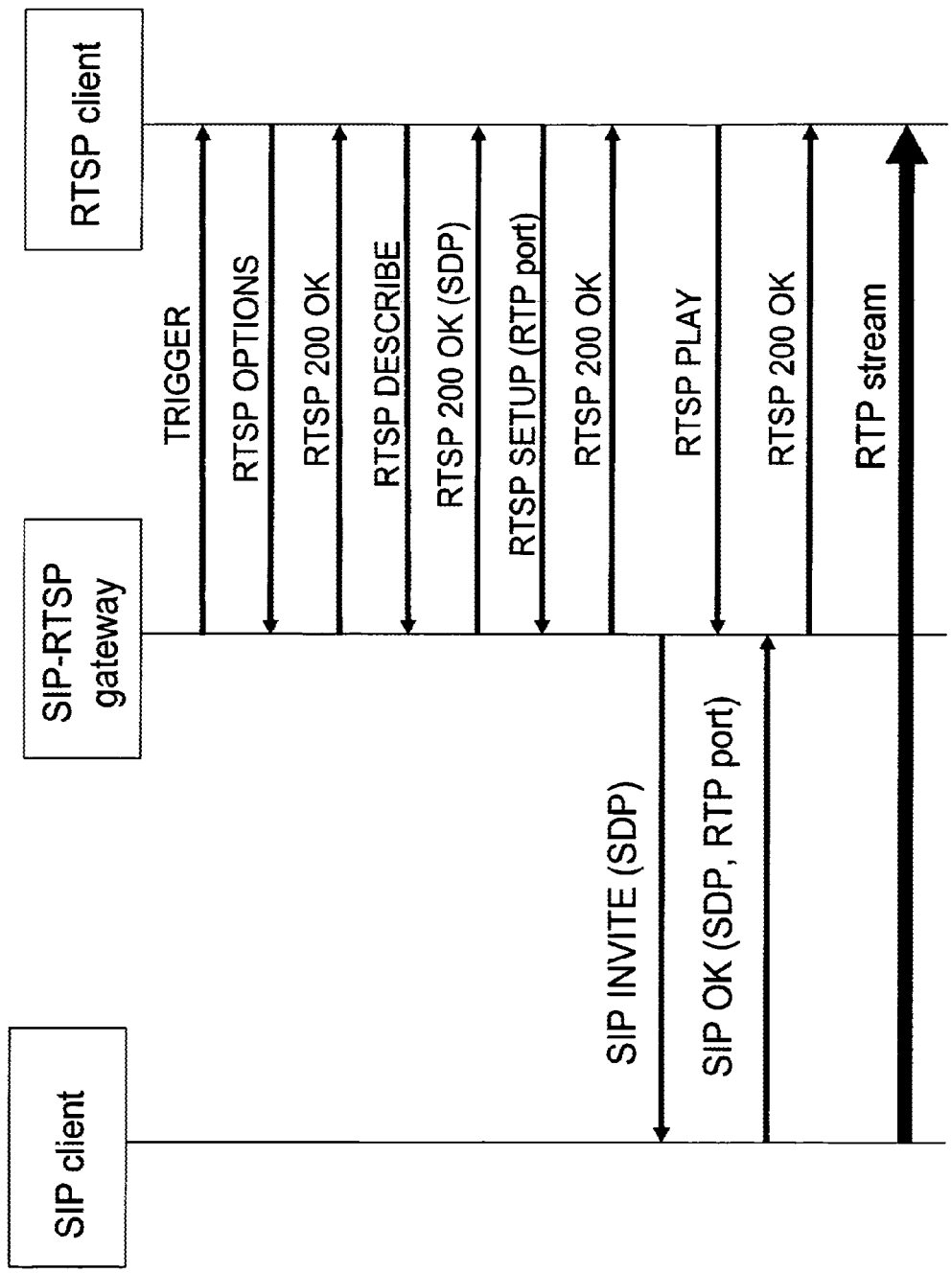
Figure 5:
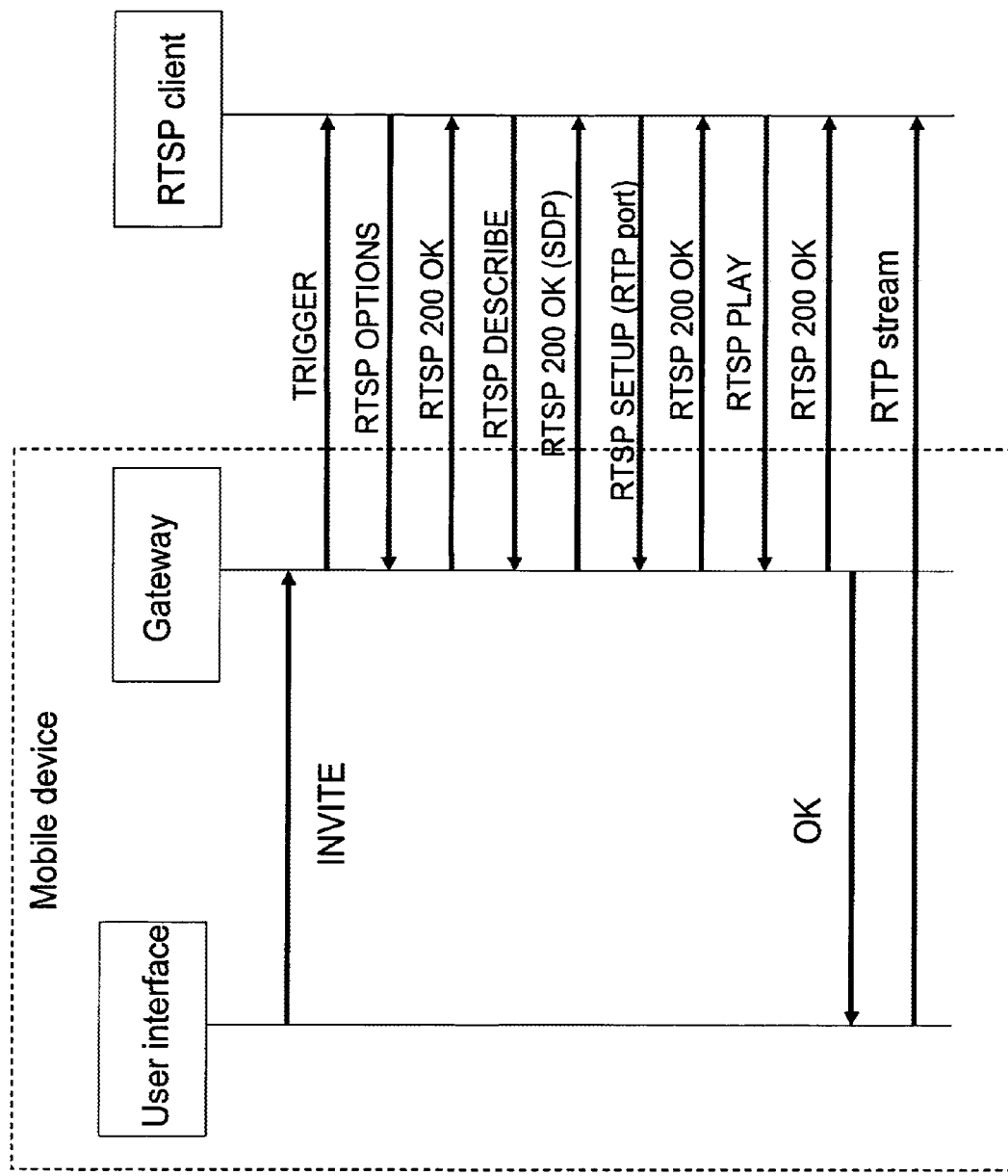

FIG. 5(*a*) illustrates an exemplary embodiment of the flow of information between the SIP client (comprised in the first terminal), the SIP-RTSP gateway and the RTSP client (comprised in the second terminal). In a first step 20 the exchange of first multimedia stream session information (SIP session) is initiated by the SIP client in the first terminal, which sends an SIP INVITE to the gateway indicating that it wants to stream a first multimedia stream to the second terminal. In further variants, the first terminal may use another protocol to initiate the exchange of first multimedia stream session information, such as H.323 or MPEG-4 Delivery Multimedia Integration Framework (DMIF) Default Signaling Protocol (DDSP).

In a second step 21 the gateway accepts the invitation and in response, provides the second terminal with a trigger to start an RTSP session with the SIP-RTSP gateway. Optionally, the gateway may first need to resolve an identifier of the second terminal transmitted by the SIP client in the first terminal, before it provides the trigger. The resolving process to obtain the network address of the second terminal may include a DNS, ENUM or other database query.

The gateway may add extra information to the trigger, such as a gateway generated identifier, that can be used by the gateway to associate the incoming RTSP request from the second terminal (the RTSP request being part of the exchange of second multimedia stream session information) with the SIP session. The information in the trigger may be included in an RTSP URI.

The trigger may have the form of a trigger message, for example a SIP content indirection request (RFC 4483), a Short Message Service (SMS) message, or an Unstructured Supplementary Service Data (USSD) message. Further, the trigger message may be passed to the RTSP client using a proprietary application programming interface (API) or a control interface on the RTSP client, for example a Web Service interface using SOAP, a Remote Procedure Call (RPC), or a telnet interface. Such interfaces may simulate a "manual user input" requesting a multimedia stream.

The incoming trigger message may be interpreted by the trigger protocol stack (for example an SOAP stack or RPC stack) which may be configured to instruct the RTSP client to request a multimedia stream or instruct another module to do so. Alternatively, the second terminal may use another protocol to request a multimedia stream, such as Microsoft Media Server protocol MMS, or Hypertext Transfer Protocol HTTP.

Thereafter, in a third step 22, the gateway handles the exchange of second multimedia session information with the RTSP client comprised in the second terminal, through transmitting the SDP information to the RTSP client and retrieving from the RTSP client the correct RTP port to which the RTP stream should be sent to. During this exchange the gateway give instructions to the RTSP client, including for example the RTP port number that should be used for receiving the (second associated) multimedia stream or for example a multicast- or other address where the stream can be retrieved from.

In a fourth step 23, the gateway confirms the SIP session to the SIP client using a SIP 200 OK message and provides the SIP client with the RTP port number, to be used for transmitting the first multimedia stream and confirms the SDP information. Finally, in the fifth and last step 24, the first terminal starts streaming the RTP multimedia stream to the second terminal.

The termination of the combined SIP/RTSP session (not depicted in FIG. 5(*a*)) may be handled in a similar way as the initiation of such session described above. If the SIP client (of the first terminal) indicates that it wants to terminate the session, the gateway may translate an SIP BYE message into an RTSP REDIRECT message (without location header). The RTSP REDIRECT message can be found in a draft of an updated RTSP version (see Internet draft RFC 2326 version 16 of the Real Time Streaming Protocol 2.0 dated 19 Nov. 2007 by Schulzrinne et al). If the RTSP client (of the second terminal) indicates that it wants to terminate the session, the gateway translates an RTSP TEARDOWN message into a SIP BYE message (which is then subsequently to be sent to the SIP client comprised in the first terminal)

In a further embodiment the streaming of multimedia may be first initiated by the gateway. In that case the gateway provides the RTSP client comprised in the second terminal with the trigger message and invites through its own SIP client functionality the SIP client of the first terminal to set up a SIP session. The flow of information between the SIP client, the gateway and the RTSP client is schematically depicted in FIG. 5(*b*).

In yet a further embodiment the gateway may be located in the first terminal. In that case the first protocol, used for the exchange of first multimedia stream session information may just be an internal protocol. The session may then be triggered by a stimulus of the user interface of the first terminal. This scheme is schematically depicted in FIG. 5(*c*), wherein the first terminal may be comprised in a mobile device. Alternatively, the stimulus received by the first terminal may also come from an external source. In that case for example an SMS message received by the mobile device may trigger a session.

Figure 6:
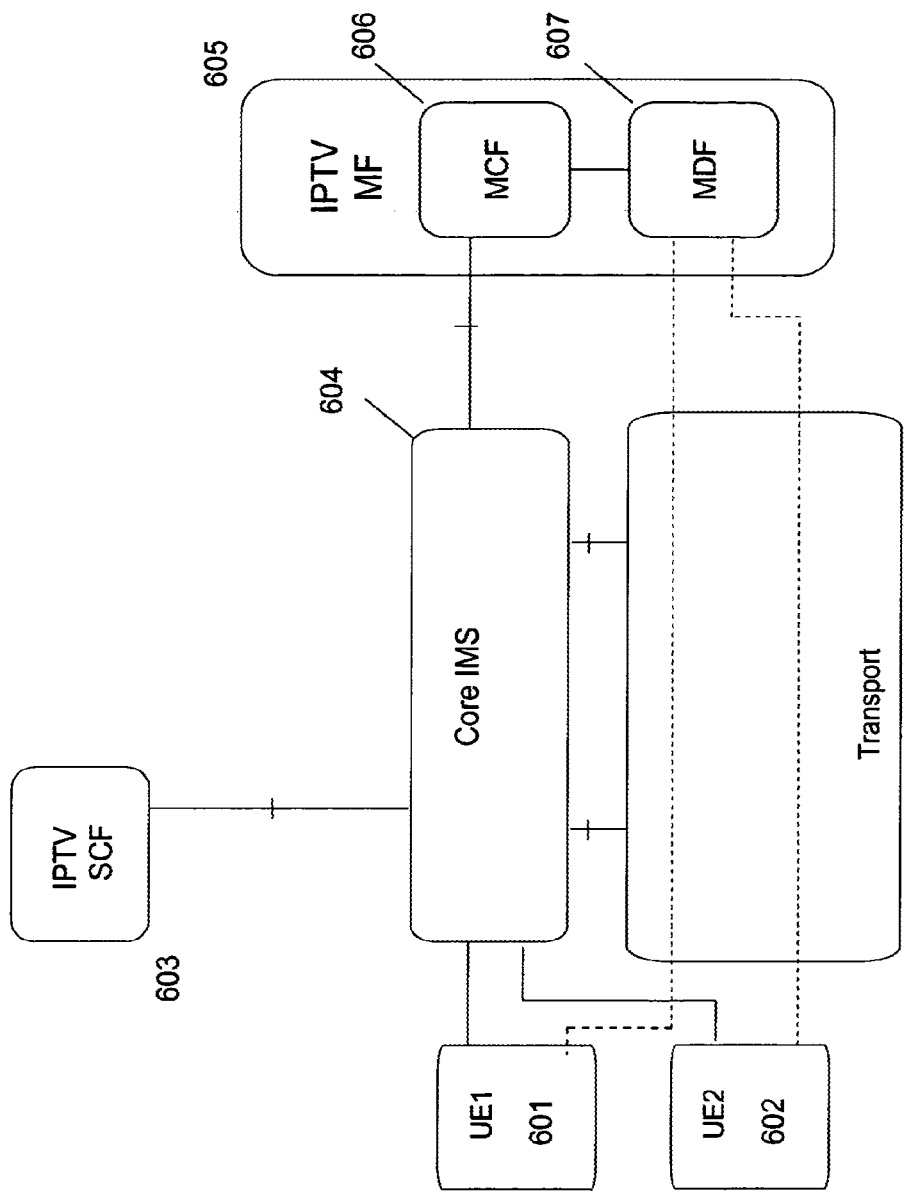
FIG. 6 depicts an IMS architecture configured for use in the invention.

FIG. 6 depicts an implementation of the invention in an IMS-based IPTV architecture as defined by ETSI TISPAN. The architecture may for example be used for a scenario, wherein a first subscriber of an IMS based (user-generated) content service, commanding a first terminal (UE1 601), wants to stream his multimedia stream to a second subscriber, commanding a second terminal (UE2 602).

In this embodiment the gateway according to the invention is of the distributed type, wherein the exchange of first multimedia stream session information with the UE1 is typically handled by the Service Control Function (SCF 603) and the exchange of second multimedia stream session information with the UE2 is handled by the Media Function (MF 605). The provisioning of the trigger to the UE2 may be controlled and/or executed by the SCF 603. In a variant, the Media Control Function 606 in the MF can send the trigger and instruct the Media Delivery Function MDF 607 on how to deliver the multimedia stream. In this example the first subscriber uses SIP to setup a multimedia session for transmitting a first multimedia stream, whereas the second subscriber uses RTSP to receive the associated second multimedia stream.

Figure 7:
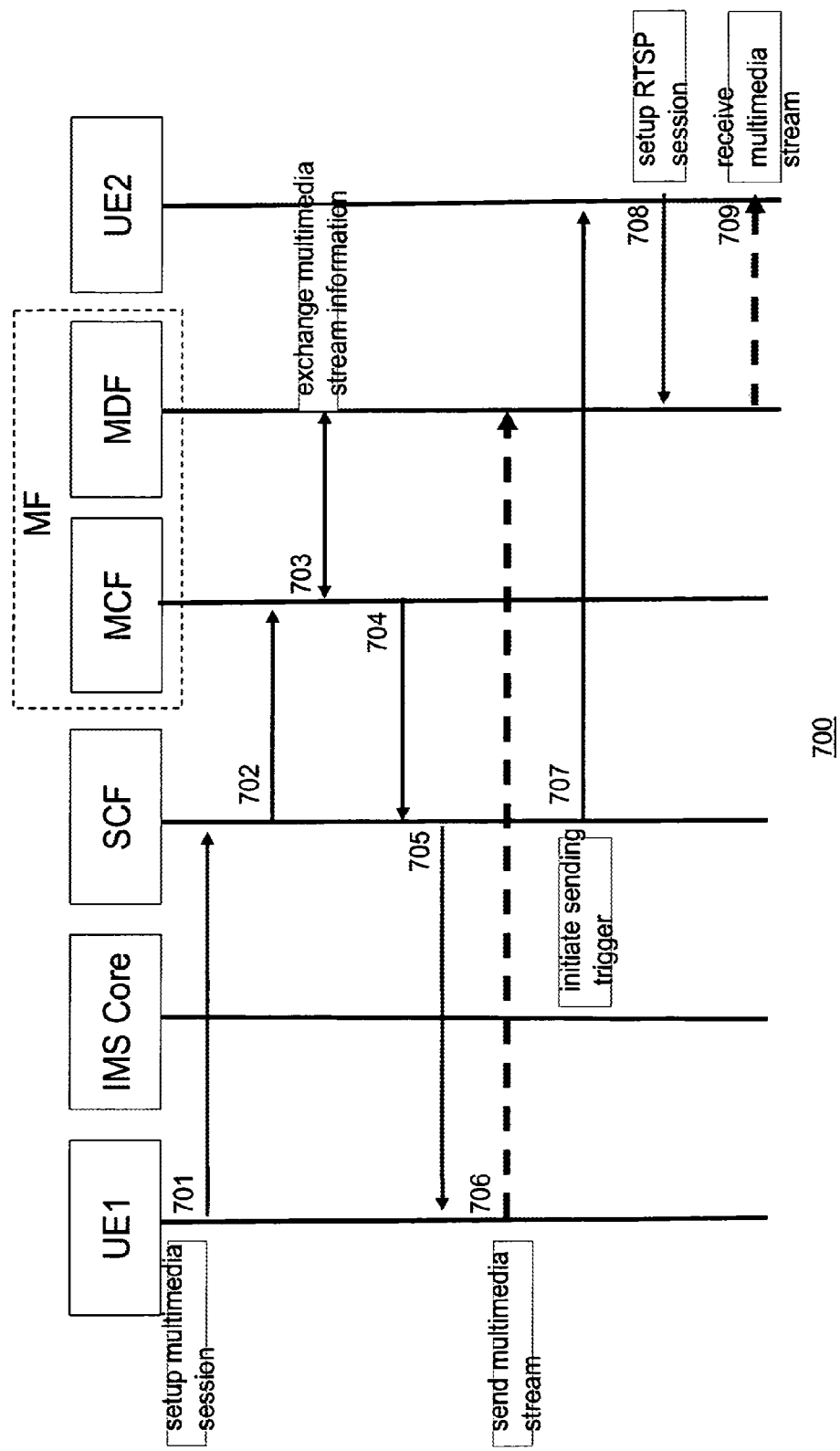
FIG. 7 depicts the flow of information in an exemplary IMS architecture configured for use in the invention.

In order for the first subscriber to invite the second subscriber to receive the multimedia stream the following steps illustrated by the flow diagram of FIG. 7 are performed. In a first step 701 a first subscriber (using UE1 601) may want to share his multimedia stream with a second subscriber (using UE2 602) by setting up a SIP session with the Service Control Function SCF 603 through the IMS core 604. The SIP INVITE request may comprise a list of subscriber terminal addresses, for example using an URI-contained list, or a list may be sent to the Service Control Function (SCF) outside the session, for example using XML Configuration Access Protocol XCAP, of which an identifier may be included in the SIP INVITE request. Alternatively, in case of a service such as Community (closed user group) TV, in which a large number of subscribers need to be addressed at once, the SIP INVITE request may just comprise a reference to the community, in the form of a Community (closed user group) Identifier, which will need to be resolved before providing multiple triggers to all community subscribers.

In a second step 702 the SCF may act as a back-to-back user agent (B2BUA) and sends a session request to the Media Control Function MCF 606, possibly through the IMS core. The session request to the MCF includes information on where to receive the multimedia stream and how to distribute it. Alternatively, the SCF may use another protocol towards the MCF such as MEGACO/H.248 or SOAP.

In a third step the MCF may send multimedia stream information to the MDF 607 to setup an RTP port and address for the first multimedia stream and associate it with a RTSP URI. The MCF may for example use SIP or MEGACO/H.248 to exchange multimedia stream information.

In a fourth step 704 the MCF response to the SCF may comprise information such as the address or RTP port, where the first multimedia stream should be transmitted to, and/or the RTSP URI to be used by the UE2 for contacting the RTSP server functionality of the gateway.

In a fifth step 705 the SCF sends a response back to the UE1, during the exchange of first multimedia stream session information, using its SIP client functionality In a sixth step 706 UE1 601 transmits the multimedia stream in the manner and/or to the location indicated by the MCF.

In a seventh step 707 the SCF uses the information from the MCF to provide a trigger to the UE2. The trigger may be a SIP content indirection request. The request may include the RTSP URL provided by the MF or another indication for the UE2 how to contact the gateway. The trigger may also be sent within an existing SIP session with the UE2, or by using a SIP REFER request.

In a eighth step 708 the invited UE2 602 initiates, in response to the SIP content indirection request, a RTSP session with the MDF (exchange of second multimedia stream session information, 708 in FIG. 7) for receive the multimedia content (second associated multimedia stream 709). The RTSP URI may include an identifier provided in the trigger message for the MDF to associate the RTSP session with the SIP session. The RTSP session (second associated multimedia stream) may be unicast or multicast. When multicast is used the MF distributes the incoming (unicast) first multimedia stream of UE1 as a multicast stream. UE2 then sends, in response to the established RTSP session, an IGMP request to receive the second associated multimedia stream.

In a ninth step the MF may send SIP NOTIFY messages to the SCF to keep the SCF informed of the status of the RTSP session, if the SCF indicated interest by sending a SIP SUBSCRIBE message to the MF (not shown in FIG. 7).

The invention is not limited to the embodiments described above, which may be varied within the scope of the accompanying claims. For instance, the term studio should not be interpreted as only meaning a professional broadcast studio. A studio within the meaning of this invention relates to all systems which could provide multimedia functionality similar to a studio, e.g. a personal computer system or another multimedia system which is capable of streaming live content to a user at a home location and in response receiving user-generated content from the user.

The invention claimed is:

1. A method, wherein a gateway is capable of communicating with a first terminal and a second terminal, the method comprising:
the gateway or the first terminal using a first protocol to exchange first multimedia session information between the first terminal and the gateway, wherein the exchange of the first multimedia session information sets up a first media stream from the first terminal, and wherein the first multimedia session information includes a type of media;
the second terminal using a second protocol to receive a trigger provided by the gateway or first terminal, wherein the trigger is to initiate an exchange of second multimedia session information between the gateway and the second terminal, and wherein the trigger serves to inform the second terminal of availability of a new multimedia stream;
in response to receiving the trigger, the second terminal using a third protocol to initiate the exchange of the second multimedia session information between the gateway and the second terminal, wherein the exchange of the second multimedia session information sets up a second media stream to the second terminal in which the second terminal participates; and
the second terminal receiving the second media stream, wherein the second media stream is associated with the first media stream.

2. The method according to claim 1, wherein the exchange of the first multimedia session information comprises:
the gateway providing to the first terminal at least part of the second multimedia session information.

3. The method according to claim 1, wherein the exchange of the second multimedia session information comprises:
the gateway providing to the second terminal at least part of the first multimedia session information.

4. The method according to claim 1, wherein the exchange of the first multimedia session information comprises:
the gateway receiving, from the first terminal, an identifier of the second terminal.

5. The method according to claim 4, further comprising:
before using the second protocol to provide the trigger to the second terminal, the gateway resolving the identifier of the second terminal into a network address of the second terminal.

6. The method according to claim 5, wherein providing the trigger to the second terminal comprises the gateway transmitting the trigger to the resolved network address of the second terminal.

7. The method of claim 1, wherein the third protocol is different from the second protocol.

8. The method of claim 1, wherein the first multimedia stream is the second multimedia stream.

9. The method of claim 1, wherein the first protocol is a peer-to-peer protocol.

10. The method of claim 1, wherein the third protocol is a client-server protocol, and wherein the second receiving terminal has client capabilities of the third protocol and not server capabilities of the third protocol.

11. The method of claim 1, wherein the trigger comprises a network address of the gateway.

12. The method of claim 11, wherein the network address is a URI or a URI reference.

13. The method of claim 1, wherein the first protocol and the second protocol are identical.

14. The method of claim 13, wherein the first protocol and the second protocol are the Session Initiation Protocol (SIP).

15. The method of claim 1, wherein the gateway is configured to associate the first multimedia session information with the second multimedia session information.

16. An article of manufacture including a non-transitory computer-readable medium, having stored thereon software instructions that, if executed by a computing device, cause the computing device to perform operations comprising:
using a first protocol to initiate an exchange of first multimedia session information between a first terminal and a gateway, wherein the exchange of the first multimedia session information sets up a first media stream from the first terminal, and wherein the first multimedia session information includes a type of media;
using a second protocol to provide a trigger to a second terminal, wherein the trigger is to initiate an exchange of second multimedia session information between the gateway and the second terminal, and wherein the trigger serves to inform the second terminal of availability of a new multimedia stream;
using a third protocol to conduct the exchange of the second multimedia session information between the gateway and the second terminal, wherein the exchange of the second multimedia session information sets up a second media stream to the second terminal in which the second terminal participates; and
using the first protocol to transmit a response to the first terminal, wherein the response causes the first terminal to begin transmission of the first media stream from the first terminal, wherein the second media stream to the second terminal is associated with the first media stream from the first terminal.

17. A gateway comprising:
a communication interface; and
memory that stores software instructions that, when executed by the gateway, cause the gateway to:
(i) exchange first multimedia session information with a first terminal using a first protocol, wherein the exchange of the first multimedia session information sets up a first media stream from the first terminal, and wherein the first multimedia session information includes a type of media,
(ii) provide a trigger to a second terminal, wherein the trigger is provided using a second protocol, in response to which the second terminal is able to initiate exchange of second multimedia session information with the gateway, and wherein the trigger serves to inform the second terminal of availability of a new multimedia stream, and (iii) exchange second multimedia session information with the second terminal, using a third protocol, wherein the third protocol is different from the first protocol, wherein the exchange of the second multimedia session information sets up a second media stream to the second terminal in which the second terminal participates.

18. The gateway of claim 17, wherein the gateway is configured to connect to a first terminal supporting a first protocol and to a second terminal supporting a second protocol,
   wherein the first protocol is Session Initiation Protocol (SIP) and the second protocol is Real Time Streaming Protocol (RTSP),
   wherein the first terminal is an originating SIP client of a user at a user side,
   wherein the gateway acts as a terminating SIP client,
   wherein the gateway is configured to confirm that the gateway is able to receive a multimedia session from the user and to provide the first terminal with multimedia session information,
   wherein the second terminal is an RTSP client,
   wherein the gateway acts as an RTSP server on behalf of the user,
   wherein the second terminal uses RTSP for session control, and
   wherein the gateway is configured to inform the second terminal that an incoming session is pending and notify the RTSP client to connect to an RTSP server function of the gateway.

19. The gateway of claim 17, wherein the gateway is configured to transmit a notification message to the second terminal in response to an invitation of the first terminal, in order to activate the second terminal to set up a second multimedia session between the second terminal and the gateway.

20. The gateway of claim 17, wherein the gateway is embedded in an IP Multi-Media Subsystem (IMS) network architecture, wherein the first protocol is Session Initiation Protocol (SIP), wherein the third protocol is Real Time Streaming Protocol (RTSP), the IMS network architecture comprising a service-control-function component and a media-function component, wherein the memory of the gateway is distributed in the IMS network architecture, such that:
   exchanging the first multimedia session information is handled by the service-control-function component within the IMS network architecture;
   triggering the second terminal is controlled by the service-control-function component within the IMS network architecture; and
   exchanging second multimedia session information is handled by the media-function component within the IMS network architecture.

21. The gateway of claim 17, wherein the gateway is configured to associate the first multimedia session information and the second multimedia session information with each other.

22. The gateway of claim 17, wherein the gateway further comprises Session Initiation Protocol (SIP) client functionality and Real Time Streaming Protocol (RTSP) server functionality.

* * * * *